July 14, 1959
N. E. PUTNAM
2,894,771
SPRING CLIP
Filed Sept. 11, 1956
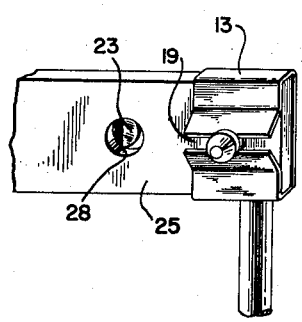
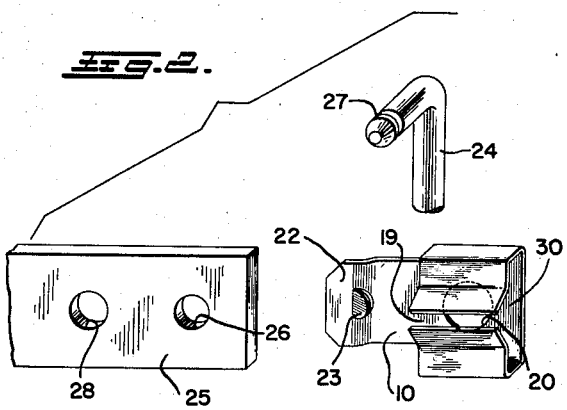
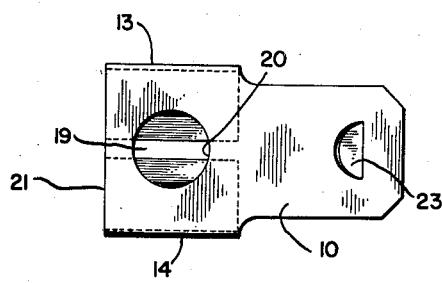
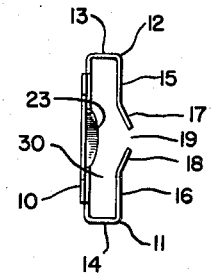
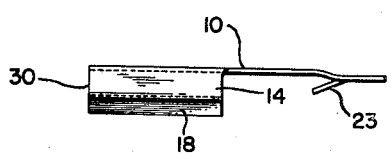
*INVENTOR*
NELSON E. PUTNAM
BY
*ATTORNEY*

United States Patent Office

2,894,771
Patented July 14, 1959

2,894,771

SPRING CLIP

Nelson E. Putnam, Livonia, Mich., assignor to General Motors Corporation, Detroit, Mich., a corporation of Delaware Application September 11, 1956, Serial No. 609,212

2 Claims. (Cl. 287—20.5)

This invention relates to spring clips and more particularly to spring clips adapted to join a rod-like element to a substantially flat element. One use for which the clip is well adapted, although by no means limited, is to secure a connecting rod between a remote control element such as a garnish mold button or inside door handle of an automobile to the actuating levers of a door latch mechanism.

An object of this invention is to provide a spring clip that will secure a rod element to a substantially flat element by simply sliding the clip to its holding position and inserting the rod through appropriate aligned apertures in the flat element and spring clip.

Other objects of the invention inherent in the invention will be apparent from the following description with reference to the accompanying drawings which show the invention in its preferred form.

In the drawings:

Figure 1 is a perspective view illustrating the flat element, rod element and spring clip in their final assembled positions;

Figure 2 is an exploded view of Figure 1;

Figure 3 is a bottom plane view of a spring clip embodying the invention;

Figure 4 is an end view of the clip; and

Figure 5 is a side view of the clip.

Referring now to Figures 3, 4 and 5, the spring clip of this invention comprises a base section generally denoted by reference number 10 with a plurality of projections of appropriate configuration. This base as shown is substantially rectangular in shape, but it is understood that other polygonal shapes may be used and it may be fabricated from steel or any other suitable material that will provide a sufficiently strong connection.

The base section 10 is provided with arm members 11 and 12 including the upwardly standing portions 13 and 14 depending from opposite sides of and adjacent one end of the base portion. The arms are further provided with inwardly bent portions 15 and 16 which overlie part of the base section 10 and are substantially parallel therewith. The ends of the inwardly bent portions 15 and 16 are spaced and thus define a slit 19. Although it is not necessary to practice the invention, the inwardly bent portions 15 and 16 may terminate in diagonally and upwardly bent portions 17 and 18 adjacent the aforesaid slit 19. As shown in the drawings, the arms 11 and 12 and the underlying base define a box-like space 30 into which the flat element fits when it is assembled with the clip.

The body section 10 is further provided with an opening 20, shown in the drawings as being circular, of a slightly greater diameter than the diameter of the rod to be joined and underlying the inwardly bent portions 15 and 16 and aligned with the slit 19. It is obvious that the opening 20 may be of other shapes than circular. Adjacent the exposed end 22 of the base section 10 is an upwardly bent tang 23 pressed or punched from the base section 10.

Figure 1 discloses the clip joining the remote control rod 24 to the actuating lever of an automobile door latch. As shown in the drawing, the lever 25 fits within the box-like space 30 defined by the arms 11 and 12 and underlying base section 10 and is slidably embraced therein. The lever 25 is provided with an aperture 26 of slightly greater diameter than the rod 24. The aperture 26 is aligned with the slit 19 and the opening 20 when the lever 25 is assembled with the subject spring clip. The lever 25 is further provided with an indentation or aperture 28 into which the aforesaid tang 23 projects to prevent inadvertent movement of the clip when it is in assembled position. The rod 24 is provided with an annular groove 27 of an appropriate diameter that will permit it to reside between the ends of the inwardly bent portions 15 and 16 without deforming them.

The rod, lever and clip may be assembled by sliding the clip on the lever 25 so that the lever is fully embraced by the arms 11 and 12 and the opening 20 is aligned with the aperture 26. The rod 24 may now be inserted through opening 20 and the aperture 26. The inwardly bent portions 15 and 16 are sprung outwardly until the rod is shoved forward enough that the ends of the inwardly bent portions 15 and 16 snap into the groove 27. The tang 23 now projects into the aperture 28 and prevents inadvertent movement of the clip once in assembled position. If it should be desired to remove the clip the inwardly bent portions 15 and 16 must be pried outwardly until their ends no longer engage the annular groove 27. After the rod is removed the clip may be removed from the lever 25 by inserting a flat prying instrument under the exposed portion of the body section 10 until the tang 23 no longer projects into the aperture 28. The clip may then be slid backward and off the end of the lever 25.

While the form of embodiment in the invention as herein disclosed constitutes a preferred form, it is to be understood that other forms might be adopted as may come within the scope of the claims.

What is claimed is:

1. A one-piece connecting member comprising an elongated base having a rod receiving aperture at one end of said base, a pair of depending flanges extending from the sides of said end of the base, said flanges being folded toward each other to define a rectangular envelope, a portion of the extremities of said flanges forming a wall of the rectangular envelope substantially parallel to said base and a further portion of said extremities extending at an angle inclined to the planes of said base and said wall, said extremities defining a uniform elongated slit forming a resilient catch, said slit being coaxially aligned with said aperture and extending the length of said extremities, the other end of said base extending away from and bent towards said envelope and a coacting tang protruding toward said slit from the base at said other end opposite the envelope and aperture.

2. In combination a connecting rod having a catch retaining groove adjacent one end thereof, a rectangular actuating lever having a first aperture adjacent one end thereof and a second aperture longitudinally spaced therefrom, a connecting clip independently supported by said lever for securing said rod to said lever and comprising an elongated base, said base having an aperture and a pair of depending flanges adjacent one end thereof, said flanges being bent toward each other to form an envelope to retain the actuating lever, a portion of the extremities of said flanges forming a wall of the envelope substantially parallel to said base and a further portion of said extremities bent diagonally to the plane of said base, said extremities defining a uniform elongated slit forming a resilient catch, said slit being in coaxial alignment with the aperture of the base and the first aperture of the lever in assembled position, said rod being releasably positioned independently of said clip within the aligned apertures to seat the resilient catch in the retaining groove of the rod, and a tang provided on a portion of the base extending opposite the envelope in alignment with the second aperture of the lever and upstruck into said second aperture to coact with the resilient catch in maintaining the connection.

References Cited in the file of this patent

UNITED STATES PATENTS

| | | |
|---|---|---|
| 1,142,979 | Pelton | June 15, 1915 |
| 2,432,492 | Tinnerman | Dec. 9, 1947 |
| 2,516,274 | Tinnerman | July 25, 1950 |
| 2,523,465 | Graham | Sept. 26, 1950 |
| 2,581,288 | Pletcher | Jan. 1, 1952 |
| 2,596,346 | Soltysik | May 13, 1952 |
| 2,633,886 | Tinnerman | Apr. 7, 1953 |
| 2,793,388 | Bartholomew | May 28, 1957 |